(12) United States Patent
Jeon et al.

(10) Patent No.: US 12,270,439 B2
(45) Date of Patent: Apr. 8, 2025

(54) WHEEL BEARING PROVIDED WITH WHEEL SPEED SENSOR HAVING PLURALITY OF SENSING UNITS

(71) Applicant: ILJIN GLOBAL Co., Ltd, Seoul (KR)

(72) Inventors: Chan Goo Jeon, Seoul (KR); Young Tae Kim, Seoul (KR); Gap Jin Han, Seoul (KR)

(73) Assignee: ILJIN GLOBAL Co., Ltd, Seoul (KR)

( * ) Notice: Subject to any disclaimer, the term of this patent is extended or adjusted under 35 U.S.C. 154(b) by 0 days.

(21) Appl. No.: 17/793,641

(22) PCT Filed: Jan. 18, 2021

(86) PCT No.: PCT/KR2021/000690
§ 371 (c)(1),
(2) Date: Oct. 3, 2022

(87) PCT Pub. No.: WO2021/145753
PCT Pub. Date: Jul. 22, 2021

(65) Prior Publication Data
US 2024/0141956 A1    May 2, 2024

(30) Foreign Application Priority Data

Jan. 17, 2020   (KR) .................. 10-2020-0006897

(51) Int. Cl.
*F16C 41/00*     (2006.01)
*B60B 27/00*     (2006.01)
*G01P 3/44*      (2006.01)

(52) U.S. Cl.
CPC ........ *F16C 41/007* (2013.01); *B60B 27/0068* (2013.01); *G01P 3/443* (2013.01); *F16C 2326/02* (2013.01)

(58) Field of Classification Search
CPC .............. F16C 41/007; F16C 2326/02; B60B 27/0068; B60B 27/00; B60B 27/0005;
(Continued)

(56) References Cited

U.S. PATENT DOCUMENTS

| | | | |
|---|---|---|---|
| 2004/0013334 A1* | 1/2004 | Landrieve | G01D 5/145 384/448 |
| 2012/0105055 A1* | 5/2012 | Takahashi | F16C 41/008 324/207.25 |

(Continued)

FOREIGN PATENT DOCUMENTS

| | | |
|---|---|---|
| DE | 102015224255 A1 * | 6/2017 |
| DE | 102018102203 A1 * | 8/2019 |

(Continued)

*Primary Examiner* — Daniel R Miller
(74) *Attorney, Agent, or Firm* — Dinsmore & Shohl LLP

(57) ABSTRACT

A wheel bearing includes a rotary element mounted on the wheel and configured to rotate together with the wheel; a non-rotary element fixedly mounted on the vehicle body; one or more rolling bodies provided between the rotary element and the non-rotary element; a sensor target mounted on the rotary element and configured to rotate together with the rotary element; and a wheel speed sensor disposed adjacent to the sensor target to sense a rotational speed of the rotary element. The wheel speed sensor may include a first sensing part and a second sensing part configured to sense a change in magnetic field caused by the rotation of the sensor target, and the second sensing part may be disposed to be spaced apart from the first sensing part in longitudinal and widthwise directions of the wheel speed sensor.

11 Claims, 5 Drawing Sheets

(58) Field of Classification Search
CPC .......... G01P 3/443; G01P 1/026; G01P 3/487;
G01P 3/488
See application file for complete search history.

(56) References Cited

U.S. PATENT DOCUMENTS

| | | | | |
|---|---|---|---|---|
| 2018/0024156 A1* | 1/2018 | Welsch | ................ | B60T 13/662 |
| | | | | 123/406.61 |
| 2018/0209482 A1* | 7/2018 | Suma | .................... | F16C 33/783 |

FOREIGN PATENT DOCUMENTS

| | | |
|---|---|---|
| JP | 2009014381 A | 1/2009 |
| JP | 2018072192 A | 5/2018 |

* cited by examiner (a)

(b)

(a)

(b)

WHEEL BEARING PROVIDED WITH WHEEL SPEED SENSOR HAVING PLURALITY OF SENSING UNITS

CROSS-REFERENCE TO RELATED APPLICATIONS

This application is a national phase of International Application No. PCT/KR2021/000690 filed on Jan. 18, 2021, which claims priority to Korean Patent Application No. 10-2020-0006897 filed on Jan. 17, 2020, the entire contents of which are herein incorporated by reference.

TECHNICAL FIELD

The present disclosure relates to a wheel bearing provided with a wheel speed sensor that detects a rotational speed of a wheel, and more particularly, to a wheel bearing configured to improve an operational stability and/or functionality of the wheel speed sensor by using a plurality of sensing parts mounted to the wheel speed sensor.

BACKGROUND ART

Recent vehicles are equipped with various control systems to have improved drivability and stability. Various sensors are mounted and used to provide information about operational states of vehicles to such control systems.

As an example of sensors provided in a vehicle, a wheel speed sensor (WSS) for detecting a rotational speed of a wheel of the vehicle is mounted on a wheel bearing that supports the wheel. Information about the rotational speed of the wheel detected by the wheel speed sensor is transmitted to an electronic control unit (ECU) or the like and used to operate a control system such as an anti-locking brake system (ABS), an electronic control system (ECS) or the like.

Referring to FIG. 1, a wheel bearing provided with a wheel speed sensor that detects a rotational speed of a wheel is exemplarily illustrated. As illustrated in FIG. 1, a wheel bearing 10 may be configured such that a rotary element 20 is connected to a non-rotary element 40 through rolling bodies 40 and thus a wheel mounted on the rotary element 20 is rotatably mounted and supported on a vehicle body connected to the non-rotary element 40. A wheel speed sensor 50 may be configured to be provided on one side of the wheel bearing 10 and to detect the rotational speed of the wheel.

Typically, through the use of a sensing part positioned adjacent to a sensor target 60 (for example, an encoder) mounted on the rotary element 20 of the wheel bearing 10 and rotating together with the wheel, the wheel speed sensor 50 may be configured to detect the rotational speed of the wheel by detecting a change in magnetic field generated due to the sensor target 60. Information about the rotational speed of the wheel detected by the wheel speed sensor 50 may be transmitted to the ECU or the like of the vehicle and used to operate a control system such as an ABS, an ECS or the like.

Incidentally, since the wheel speed sensor 50 mounted on the wheel bearing 10 is typically configured to detect a rotational speed of the wheel using a single sensing part, when an abnormality occurs in the single sensing part of the wheel speed sensor 50, a terminal portion connected to the single sensing part, or the like, accurate information about the rotational speed of the wheel may not be provided from the wheel speed sensor 50. As a result, a vehicle control system such as an ABS may not be stably controlled.

In particular, in a case of autonomous vehicles, which have recently attracted attention, since most of vehicle driving controls are performed by a control system, when there is an abnormality in an operation of the vehicle, it may be difficult to immediately respond to the abnormality. Therefore, abnormalities occurring in the wheel speed sensor or the like may cause a more serious risk.

As an approach to solve such matters, a method of securing redundancy or the like by providing a plurality of sensing parts in the wheel speed sensor has been considered. However, in the case in which the plurality of sensing parts are mounted on the wheel speed sensor, the plurality of sensing parts may be less likely to be arranged with respect to a sensor target with an appropriate air gap. This may generate a difference in output signals provided from the plurality of sensing parts, or may cause a signal delay between the output signals provided from the plurality of sensing parts, which makes it difficult to secure reliable redundancy.

Technical Problem

The present disclosure is to solve the above matters in the related art, and is to provide a wheel bearing for a vehicle configured such that a plurality of sensing parts are provided in a wheel speed sensor mounted on the wheel bearing and used to improve redundancy and operational reliability of the wheel speed sensor or to improve functionality of the wheel speed sensor, and the plurality of sensing parts provided in the wheel speed sensor are easily arranged inside in the wheel speed sensor with an appropriate air gap, thus performing reliable signal detection without causing a signal delay between output signals from the plurality of sensing parts.

Technical Solution

Representative configurations of the present disclosure for achieving the above object are as follows.

According to an aspect of the present disclosure, there is provided a wheel bearing for supporting a wheel of a vehicle so that the wheel is rotatably mounted on a vehicle body. The wheel bearing according to the aspect of the present disclosure may include: a rotary element mounted on the wheel and configured to rotate together with the wheel; a non-rotary element fixedly mounted on the vehicle body; one or more rolling bodies provided between the rotary element and the non-rotary element; a sensor target mounted on the rotary element and configured to rotate together with the rotary element; and a wheel speed sensor disposed adjacent to the sensor target to sense a rotational speed of the rotary element. According to an example embodiment of the present disclosure, the wheel speed sensor may include a first sensing part and a second sensing part which are configured to sense a change in magnetic field caused by the rotation of the sensor target, and the second sensing part may be disposed to be spaced apart from the first sensing part in a longitudinal direction and a widthwise direction of the wheel speed sensor.

According to an example embodiment of the present disclosure, the first sensing part and the second sensing part may be configured as a wheel speed detection sensor configured to detect the rotational speed of the wheel.

According to an example embodiment of the present disclosure, the first sensing part and the second sensing part may be formed as one of a Hall sensor, an anisotropic magnetoresistance (AMR) sensor, and a giant magnetoresistance (GMR) sensor.

According to an example embodiment of the present disclosure, the sensor target may be formed in a structure in which one or more pairs of magnetic poles composed of N poles and S poles are arranged along a circumferential direction.

According to an example embodiment of the present disclosure, the first sensing part and the second sensing part may be configured to sense the magnetic poles of a same polarity provided in the sensor target at a same time.

According to an example embodiment of the present disclosure, the sensor target may include a first sensor track positioned in a radially inward direction and a second sensor track positioned in a radially outward direction, the first sensing part may be disposed to face the first sensor track and configured to sense the change in magnetic field generated by the first sensor track, and the second sensing part may be disposed to face the second sensor track and configured to sense the change in the magnetic field generated by the second sensor track.

According to an example embodiment of the present disclosure, the first sensor track and the second sensor track may be formed to include a same number of pairs of magnetic poles.

According to an example embodiment of the present disclosure, the first sensor track and the second sensor track may be disposed to intersect with each other so that the magnetic poles are not aligned with each other in a radial direction.

According to an example embodiment of the present disclosure, the first sensor track may be configured such that a circumferential length of one magnetic pole provided in the first sensor track at a center in the radial direction is 90% or more of a circumferential length of one magnetic pole provided in the second sensor track at a center of the second sensor track in the radial direction.

According to an example embodiment of the present disclosure, the sensor target may be configured such that interfaces between the N poles and the S poles are inclined in a similar fashion with respect to the radial direction.

According to an example embodiment of the present disclosure, the wheel speed sensor further include a first terminal portion electrically connected to the first sensing part, and a second terminal portion electrically connected to the second sensing part.

According to an example embodiment of the present disclosure, the first terminal portion and the second terminal portion may include a power terminal electrically connected to an external power supply and a signal terminal electrically connected to an external control device.

According to an example embodiment of the present disclosure, the wheel speed sensor may be fixedly mounted on the vehicle body.

According to an example embodiment of the present disclosure, the rotary element may include a wheel hub on which the wheel is mounted, and at least one inner ring mounted to the wheel hub in a press-fitting manner, and the non-rotary element may be configured as an outer ring coupled to a chassis component of the vehicle body.

In addition to this, a wheel bearing for a vehicle according to the present disclosure may further include other additional configurations without departing from the technical sprit of the present disclosure.

Advantageous Effects

A wheel bearing according to an example embodiment of the present disclosure is configured to include a plurality of sensing parts. Thus, even if an abnormality occurs in any one of the plurality of sensing parts, a rotational speed of a wheel can be measured by other sensing parts. This makes it possible to improve operational reliability and redundancy of the wheel speed sensor and improve an operational stability of control systems operated based on the measured signals.

Further, a wheel bearing for a vehicle according to an example embodiment of the present disclosure is configured such that a plurality of sensing parts are arranged to be spaced apart from each other inside the wheel speed sensor in a longitudinal direction and a widthwise direction of the wheel speed sensor. This makes it possible to arrange the plurality of sensing parts inside the wheel speed sensor while easily adjusting an air gap of the plurality of sensing parts, thereby measuring a rotational speed of the wheel more reliably.

Furthermore, a wheel bearing according to an example embodiment of the present disclosure is configured such that a plurality of sensing parts sense poles of the same polarity formed in a sensor target at the same time to output the same kind of signal. Thus, even when an abnormality occurs in one of the plurality of sensing parts and a rotational speed of a wheel is measured using other sensing parts, it is possible to reliably perform continuous speed measurement without causing a signal delay between output signals from the plurality of sensing parts, thereby more stably securing redundancy of the wheel speed sensor.

Furthermore, a wheel bearing according to an example embodiment of the present disclosure is configured such that a sensor target that generates a change in magnetic field while rotating together with a rotary element is formed in a structure (for example, a dual track structure) in which different sensor tracks are disposed inward and outward in a radial direction, respectively, and a plurality of sensing parts of a wheel speed sensor are disposed to face the different sensor tracks, respectively, or such that an interface between magnetic poles of the sensor target is formed in a direction inclined with respect to the radial direction. This makes it possible to more easily arrange the plurality of sensing parts, which are arranged to be spaced apart from each other, on the magnetic poles of the same polarity.

EXPLANATION OF REFERENCE NUMERALS

Figure 1:
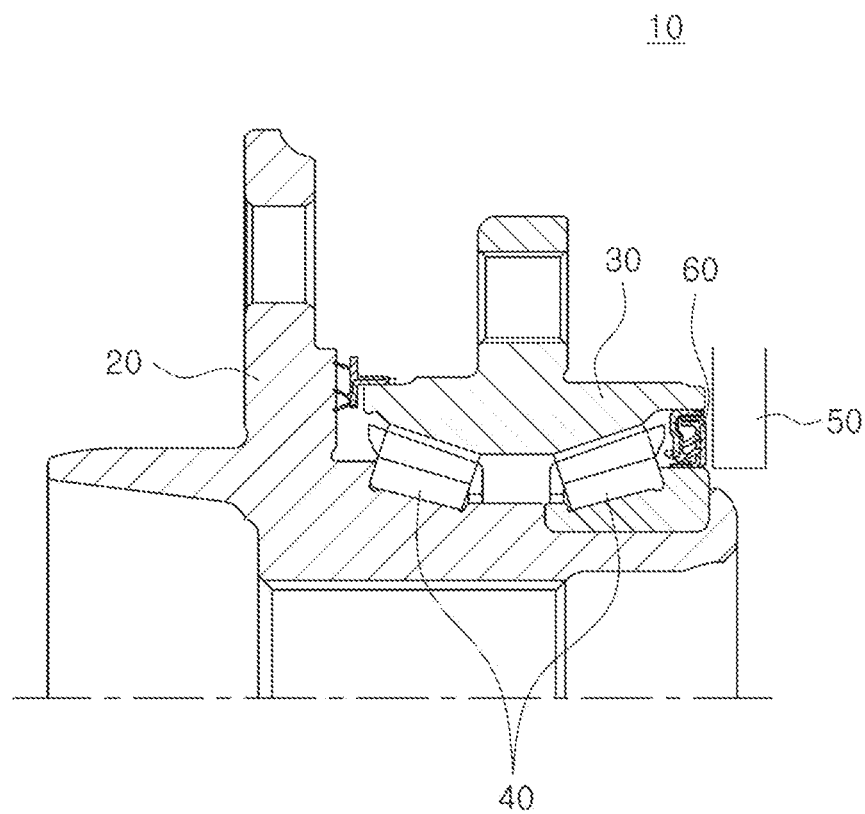
FIG. 1 exemplarily illustrates a wheel bearing provided with a wheel speed sensor in the related art.

100: Wheel bearing
110: Rotary element

120: Wheel hub
130: Inner ring
140: Non-rotary element
150: Rolling body
200: Wheel speed sensor
210: Body
220: First sensing part
222: First lead terminal
224: First terminal portion
230: Second sensing part
232: Second lead terminal
234: Second terminal portion
240: Cable
250: Housing
252: Coupling portion
254: Mounting hole

DETAILED DESCRIPTION

Preferred example embodiments of the present disclosure will be described in detail below with reference to the appended drawings to such an extent that the present disclosure can be readily carried out by one of ordinary skill in the art.

Detailed descriptions of parts irrelevant to the present disclosure will be omitted for the purpose of clearly describing the present disclosure. Throughout the specification, the same constituent elements will be described using the same reference numerals. In addition, the shapes and sizes of the respective constituent elements illustrated in the drawings are arbitrarily illustrated for the sake of convenience of description, and hence the present disclosure is not necessarily limited to the illustrated shapes and sizes. That is, it should be understood that specific shapes, structures, and characteristics described in the specification may be modified from one embodiment to various embodiments without departing from the spirit and scope of the prevent disclosure, and positions or dispositions of individual constituent elements may be modified without departing from the spirit and scope of the prevent disclosure. Therefore, detailed descriptions to be described below should be construed as non-limitative senses, and the scope of the prevent disclosure should be understood to include appended claims and their equivalents.

Wheel Speed Sensor and Wheel Bearing according to Example Embodiment of Present Disclosure Referring to FIGS. 2 to 7, a wheel speed sensor according to an example embodiment of the present disclosure and a wheel bearing including the same are exemplarily illustrated. The wheel speed sensor according to an example embodiment of the present disclosure and the wheel bearing including the same may be formed generally similar to the above-mentioned conventional wheel speed sensor and wheel bearing, and may be configured to improve operational reliability and/or functionality of the wheel speed sensor using a plurality of sensing parts provided in the wheel speed sensor, as will be described later.

Figure 2:
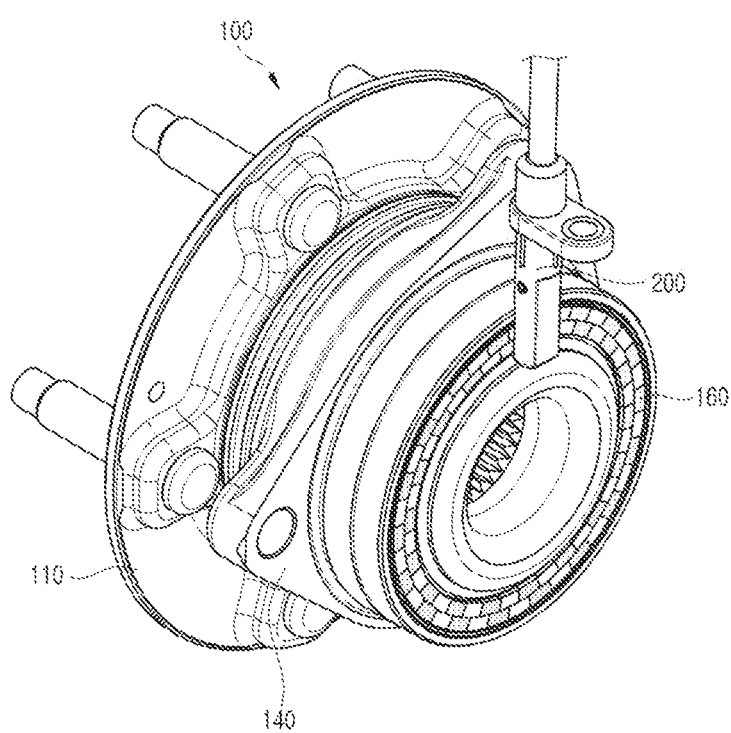
FIG. 2 exemplarily illustrates a wheel bearing provided with a wheel speed sensor according to an example embodiment of the present disclosure.
Figure 3:
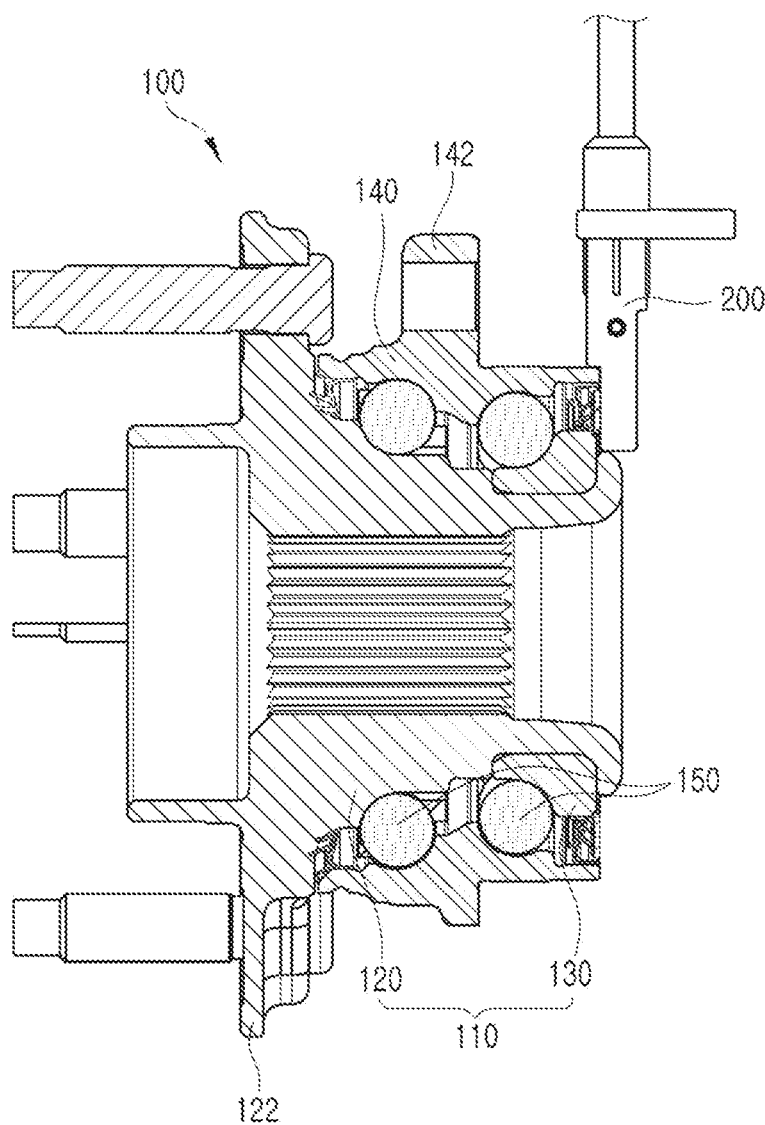
FIG. 3 exemplarily illustrates a cross-sectional structure of the wheel bearing provided with the wheel speed sensor according to an example embodiment of the present disclosure.
Figure 4:
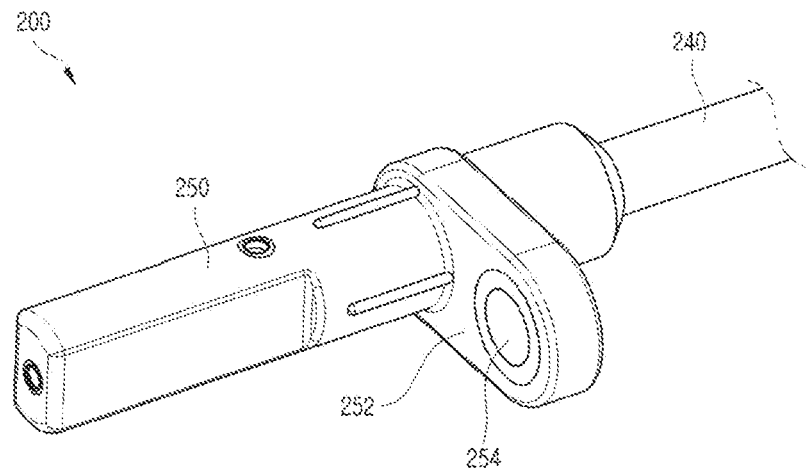
FIG. 4 exemplarily illustrates the wheel speed sensor according to an example embodiment of the present disclosure.

First, a structure of a wheel bearing 100 formed according to an example embodiment of the present disclosure will be described. The wheel bearing 100 according to an example embodiment of the present disclosure may be formed in a structure similar to a typical wheel bearing in its entirety as illustrated in FIGS. 2 and 3. For example, the wheel bearing 100 according to an example embodiment of the present disclosure may be configured such that a rotary element 110 is rotatably mounted on a non-rotary element 140 through rolling bodies 150 like the wheel bearing in the related art, and a wheel mounted on the rotary element 110 is rotatably mounted and supported on the non-rotary element 140 fixed to a vehicle body.

According to an example embodiment of the present disclosure, the rotary element 110 may be configured to include a wheel hub 120 on which the wheel is mounted, and an inner ring 130 mounted on the wheel hub 120 in a press-fitting manner. The non-rotary element 140 may be configured as an outer ring that is coupled to a chassis component of a vehicle and fixed to a vehicle body, and the like. However, the wheel bearing according to an example embodiment of the present disclosure is not limited to the above-described structure, but may be modified in other various structures that are applicable to the wheel bearing in the related art.

According to an example embodiment of the present disclosure, the wheel hub 120 constituting the rotary element 110 may be formed in a substantially cylindrical shape in which the wheel hub 120 extends in the axial direction. A wheel mounting flange 122 (hub flange) may be provided on an outer peripheral surface of the wheel hub 120. The wheel mounting flange 122 may be formed in a shape extending outward in a radial direction of the wheel hub 120, and may be used to mount the wheel and/or a brake disc of the wheel through bolt members or the like. On the other hand, an inner ring 130 may be mounted at a vehicle-body-side end portion of the wheel hub 120. A raceway (inner raceway) may be configured to be formed on a portion of the outer peripheral surface of the wheel hub 120 to support the rolling bodies 150 in a radially inward direction.

According to an example embodiment of the present disclosure, at least one inner ring 130 may be mounted on the outer peripheral surface of the wheel hub 120 in a press-fitting manner. For example, the inner ring 130 may be mounted and held on the wheel hub 120 by allow the end portion of the wheel hub 120 to undergo a plastic deformation as shown in FIG. 3 or by fastening nuts or the like to the vehicle-body-side end portion of the wheel hub 120, in a state in which the inner ring 130 is pressed into the vehicle-body-side end portion of the wheel hub 120. Further, a raceway (inner raceway) with which the rolling bodies 400 are brought into contact, may be formed on the outer peripheral surface of the inner ring 130 to support the rolling bodies 400 in the radially inward direction.

In the example embodiment described with reference to the drawings, the wheel bearing is configured such that one raceway for supporting the rolling bodies is directly formed on the portion of the outer peripheral surface of the wheel hub. However, the wheel bearing according to an example embodiment of the present disclosure is not limited to such a configuration, but may be modified to have other various wheel bearing structures. For example, two inner rings may be mounted on the wheel hub and raceways (inner raceways) may be formed by the two inner rings, or the inner rings may be mounted inward of the wheel hub.

According to an example embodiment of the present disclosure, the outer ring constituting the non-rotary element 140 may include a vehicle-body-side mounting flange 142 formed on an outer peripheral surface of the outer ring to mount the wheel bearing 100 to the vehicle body. The outer ring may be configured to have a raceway (outer raceway) in contact with the rolling bodies 400 on an inner peripheral surface of the outer ring. The raceway (outer raceway) formed on the inner peripheral surface of the outer ring may be configured to accommodate and support the rolling bodies 150 as rolling elements between the outer raceway and the inner raceway in cooperation with the raceway (inner raceway) formed on the rotary element (for example, the wheel hub 120 and/or the inner ring 130).

According to an example embodiment of the present disclosure, the rolling bodies 150 may be disposed between the rotary element 110 and the non-rotary element 140 to perform a function of rotatably supporting the wheel mounted on the rotary element 110 with respect to the vehicle body to which the non-rotary element 140 is coupled.

Further, according to an example embodiment of the present disclosure, a wheel speed sensor 200 may be provided on one side of the wheel bearing 100 to detect a rotational speed of the wheel mounted on the wheel bearing 100 (a rotational speed of the rotary element 110 constituting the wheel bearing 100). Specifically, like a wheel speed sensor in the related art, the wheel speed sensor 200 may be configured to sense a change in magnetic field generated by a sensor target 160 (encoder, tone wheel, or the like) that is disposed on one side of the wheel bearing and rotates together with the wheel, and detect the rotational speed (and/or rotational angle, rotational direction, or the like) of the wheel.

According to an example embodiment of the present disclosure, the wheel speed sensor 200 may be formed in a structure in which a plurality of sensing parts 220 and 230 are mounted on a body 210 of the wheel speed sensor 200. The plurality of sensing parts 220 and 230 may be electrically connected to an external power supply and a control device via a terminal portion and/or a cable. These members may be protected by being surrounded by a housing 250.

Figure 5:
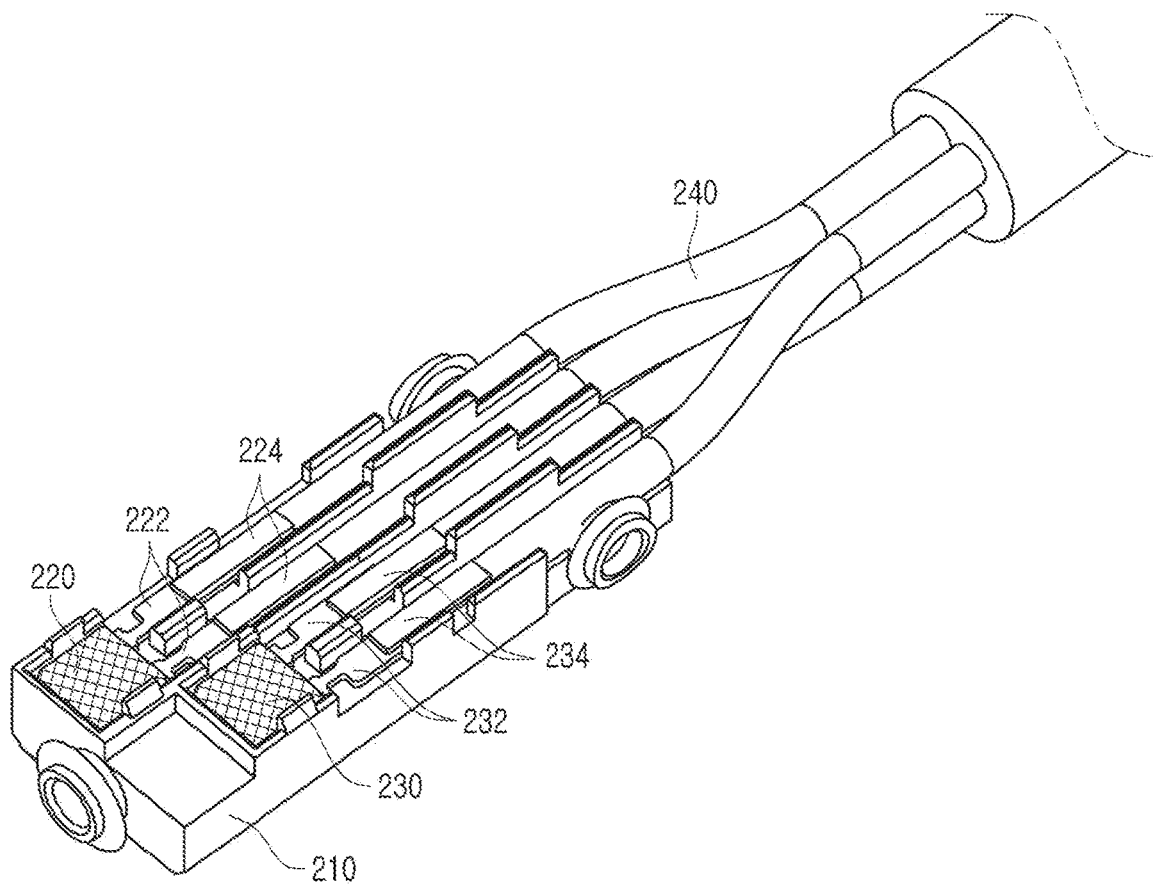
FIG. 5 exemplarily illustrates an internal structure of the wheel speed sensor according to an example embodiment of the present disclosure.
Figure 6A:
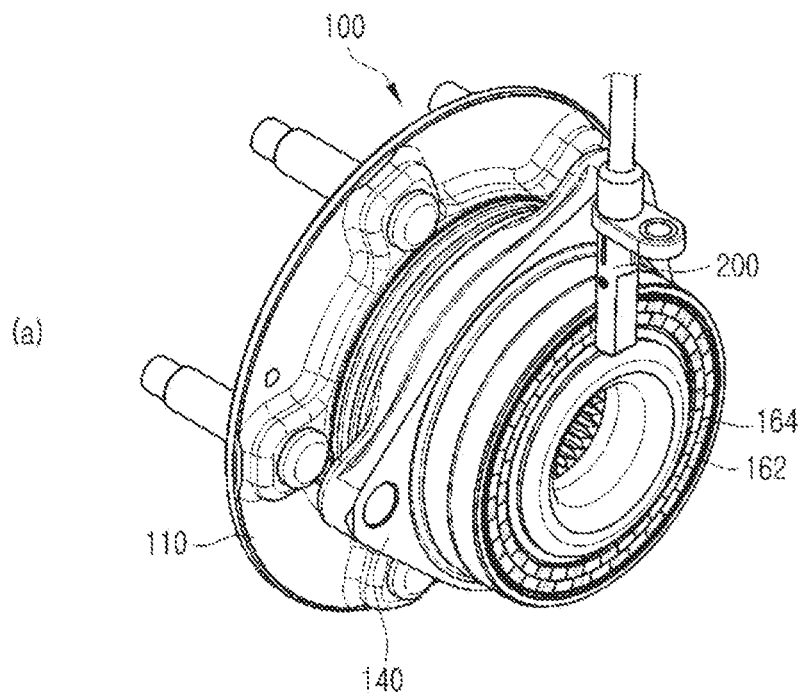
FIGS. 6A, 6B, 7A, and 7B exemplarily illustrate an arrangement relationship between a plurality of sensing parts provided in the wheel speed sensor and a sensor target according to an example embodiment of the present disclosure.
Figure 6B:
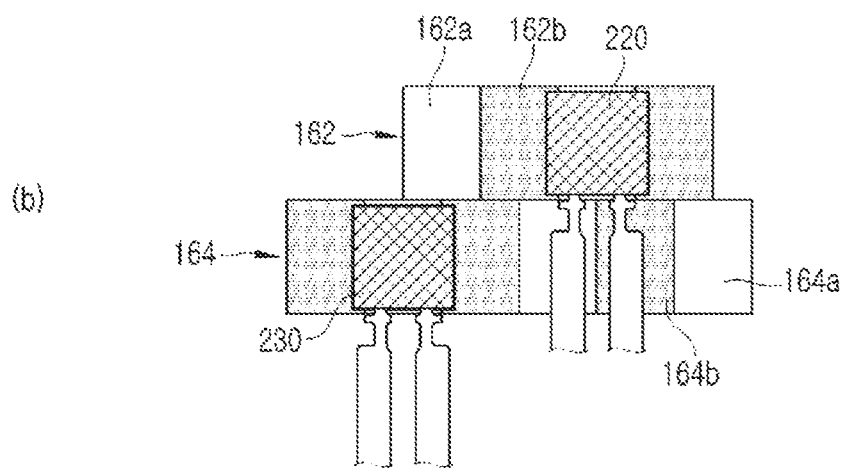

According to an example embodiment of the present disclosure, the body 210 is a portion constituting an inner body of the wheel speed sensor 200, and may be formed in a substantially rod-shaped structure extending in one direction as a whole as illustrated in FIG. 5. The body 210 may perform a function of supporting a sensing part (to be describe later) and/or a conductive terminal portion (to be describe later) electrically connected to the sensing part, which are mounted on one side of the sensing part.

According to an example embodiment of the present disclosure, the body 210 may be configured such that a plurality of sensing parts (the first sensing part 220 and the second sensing part 230) for measuring an operational state of the vehicle are mounted and supported on one side (for example, upper surface) of the body 210. These sensing parts (the first sensing part 220 and the second sensing part 230) may be configured as a Hall sensor, an anisotropic magneto-resistance (AMR) sensor, a giant magneto-resistance (GMR) sensor, or the like to detect a change in magnetic field generated with the rotation of the sensor target 160.

Further, according to an example embodiment of the present disclosure, as illustrated in FIG. 5, the plurality of sensing parts (the first sensing part 220 and the second sensing part 230) provided in the wheel speed sensor 200 may be disposed to be spaced apart from each other along longitudinal and widthwise direction of the body 210 (that is, along longitudinal and widthwise directions of the wheel speed sensor).

For example, in the case of the example embodiment illustrated with reference to the drawings, the first sensing part 220 provided in the body 210 of the wheel speed sensor 200 may be mounted adjacent to a front end portion of the body 210, and the second sensing part 230 may be mounted at a position spaced apart rearward in a longitudinal direction and spaced apart in a widthwise direction from the first sensing part 220.

As described above, by disposing the plurality of sensing parts (the first sensing part 220 and the second sensing part 230) to be spaced apart from each other in the longitudinal direction and the widthwise direction of the wheel speed sensor, it is possible to arrange the plurality of sensing parts with respect to the sensor target 160 at a desired air gap, respectively. As a result, it is possible to more reliably detect the operational state of the vehicle using the plurality of sensing parts.

Further, with the arrangement structure of the first sensing part 220 and the second sensing part 230 spaced apart from each other in the longitudinal direction and the widthwise direction, in the wheel speed sensor 200 according to an example embodiment of the present disclosure, the plurality of sensing parts may be easily arranged to sense magnetic poles of the same polarity, which will be described later. This makes it possible to prevent the generation of a signal delay between output signals from the plurality of sensing parts, thus securing redundancy of the wheel speed sensor with high reliability.

Further, according to an example embodiment of the present disclosure, the plurality of sensing parts (the first sensing part 220 and the second sensing part 230) provided in the wheel speed sensor may be composed using the same type of IP-chip or different types of IP-chips. When the plurality of sensing parts are composed using the different types of IP-chips, a multi-function may be implemented using information measured by the plurality of sensing parts.

According to an example embodiment of the present disclosure, the plurality of sensing parts (the first sensing part 220 and the second sensing part 230) provided in the wheel speed sensor may include a lead terminal extending to one direction at one end portion side of the respective sensing part and electrically connected to an external power supply and a control device. The lead terminal provided in the sensing parts may be configured with a plurality of terminals including a power terminal for supplying power and a signal terminal for transmitting a signal.

For example, as illustrated in FIG. 5, the wheel speed sensor 200 may be configured such that a pair of first lead terminals 222 extending to one side is provided in the first sensing part 220 and a pair of second lead terminals 232 extending to one side is provided in the second sensing part 230. These lead terminals provided in the sensing parts may be electrically connected to conductive terminal portions (a first terminal portion 224 and a second terminal portion 234), respectively. The sensing parts may be electrically connected to the external power supply and/or the control device via the cable 240 connected to the respective conductive terminal portions.

According to an example embodiment of the present disclosure, as illustrated in the drawings, the conductive terminal portions (the first terminal portion 224 and the second terminal portion 234) may be formed in the form of a thin metal plate extending in the longitudinal direction. The conductive terminal portions may include a plurality of terminals corresponding to the number of lead terminals provided in the sensing parts. For example, as illustrated in the drawings, the conductive terminal portions (the first terminal portion 224 and the second terminal portion 234) may be composed of a plurality of terminals including a power terminal for transmitting power and a signal terminal for transmitting a signal.

In the example embodiment illustrated with reference to the drawings, the lead terminals and the conductive terminal portions of each sensing part are separately formed and connected to each other so that the sensing part is electrically connect to the cable 240. However, the wheel speed sensor according to an example embodiment of the present disclosure may not be necessarily formed in such a structure. The cable may be directly connected to the lead terminals of the sensing part to form the wheel speed sensor without additional conductive terminals (that is, the lead terminals and the conductive terminal portions of the sensing part are integrally formed with each other).

Further, the wheel speed sensor 200 according to an example embodiment of the present disclosure may be also configured such that some or all of the body, the sensing parts, the conductive terminal portions, the cable, and the like described above are surrounded by the housing 250 to protect internal sensors or terminals by the housing 250. For example, the housing 250 may be formed through a plastic injection molding in a state in which the sensing parts, the terminal portions, the cable, and the like are mounted on the body, so that some or all of these members are surrounded by the housing 250.

According to an example embodiment of the present disclosure, the housing 250 of the wheel speed sensor 200 may include a coupling portion 252 provided on one side and may be fixedly mounted to the side of the vehicle body through a mounting hole 254 formed in the coupling portion 252. For example, the wheel speed sensor 200 is fixedly mounted on the non-rotary element 140 (for example, the outer ring) of the wheel bearing 100 according to an example embodiment of the present disclosure, or a knuckle (not illustrated) to which the non-rotary element 140 is coupled. Thus, the wheel speed sensor 200 may be disposed in the vicinity of the wheel bearing while being fixed to the vehicle body.

According to an example embodiment of the present disclosure, the plurality of sensing parts (the first sensing part 220 and the second sensing part 230) provided in the wheel speed sensor 200 may be disposed to face the sensor target mounted on the rotary element of the wheel bearing at different positions. In an example embodiment, the first sensing part 220 and the second sensing part 230 may be configured to sense magnetic poles of the same polarity formed in the sensor target 160 at the same time.

In general, the sensing parts provided in the wheel speed sensor of the wheel bearing may operate to sense an intensity of a magnetic field induced by the rotation of the sensor target and generate a signal corresponding to the intensity of the magnetic field. For example, the sensing part may output a positive electrical signal when being brought close to the N pole of the sensor target and output a negative electrical signal when being brought close to the S pole of the sensor target. Accordingly, when the sensing target rotates once, the sensing part may output an electric signal value of zero at a boundary between N and S poles, and may output positive and negative electric signals representing that the intensity value of the magnetic field is maximum at the middle of each of the N pole and the S pole. Thus, the sensing part may operate to output a signal of a sine wave of one cycle when passing through a pair of poles provided in the sensor target.

On the other hand, when the plurality of sensing parts (the first sensing part 220 and the second sensing part 230) are provided like the wheel speed sensor 200 according to an example embodiment of the present disclosure, each of the sensing parts may sense different magnetic poles and outputs different electrical signals. In this case, a phase difference and signal delay may occur between the electrical signals output from the plurality of sensing parts. When an abnormality occurs in one sensing part and thus when trying to use the other sensing part, information of the signal from the other sensing part may not be available. This makes it difficult to perform accurate and reliable speed measurement.

In contrast, in the wheel speed sensor 200 according to an example embodiment of the present disclosure, since the plurality of sensing parts provided in the wheel speed sensor 200 are disposed to face the sensor target 160 so as to sense magnetic poles of the same polarity provided in the sensor target 160 at the same time (that is, when the first sensing part 220 senses the N pole, the second sensing part 230 also senses the N pole, and when the second sensing part 230 detects the S pole, the first sensing part 220 also senses the S pole), the output signals from the plurality of sensing parts provided in the wheel speed sensor 200 may become signals of the same phase generated by sensing the same magnetic pole. Thus, when an abnormality occurs in one sensing part, the other sensing part may be used to stably measure the rotational speed of the wheel.

To do this, the wheel speed sensor 200 according to an example embodiment of the present disclosure may be configured to measure the rotational speed of the wheel while being disposed to face the sensor target 160 interacting with the wheel speed sensor 200 as follows.

For example, according to an example embodiment of the present disclosure, the sensor target 160 that is mounted on the rotary element of the wheel bearing 100 to generate a change in magnetic field may include a first sensor track 162 positioned in a radially inward direction a second sensor track 164 positioned in a radially outward direction (for example, in a dual track structure). Like a sensor track for a wheel bearing sensor in the related art, plural pairs of poles composed of N poles and S poles are repeatedly arranged in a circumferential direction to generate changes in magnetic field therearound while rotating together with the rotary element of the vehicle.

In addition, the wheel speed sensor 200 disposed adjacent to the sensor target 160 to sense a change in magnetic field generated by the sensor target 160 may be configured such that the first sensing part 220 is disposed to face the first sensor track 162 to sense the change in magnetic field generated by the magnetic pole pair formed in the first sensor track 162, and the second sensing part 230 is disposed to face the second sensor track 164 to sense the change in magnetic field generated by the magnetic pole pair formed in the second sensor track 164.

In this case, the first sensor track 162 and the second sensor track 164 which constitute the sensor target 160 are formed to have the same number of pairs of magnetic poles, so that the first sensing part 220 and the second sensing part 230 continuously sense the same magnetic poles. For the sake of easy arrangement of the first sensing part 220 and the second sensing part 230, the magnetic poles of the first sensing part 220 and the second sensing part 230 may be arranged to intersect each other rather than being aligned with each other in the radial direction (see FIGS. 2 and 6). The expression "the magnetic poles of the first sensing part 220 and the second sensing part 230 may be arranged to intersect each other rather than being aligned with each other in the radial direction" used herein means that interfaces between the magnetic poles of the first sensing part 220 and interfaces between the magnetic poles of the second sensing part 230 are intersected such that the interfaces are not aligned in the radial direction, i.e., means that the first sensing part 220 and the second sensing part 230 are disposed to be phase-shifted in the circumferential direction rather than being aligned with each other.

With this configuration, by the sensor tracks (the first sensor track 162 and the second sensor track 164) positioned inward and outward in the radial direction and the plurality of sensing parts (the first sensing part 220 and the second sensing part 230) arranged to be spaced apart in the longitudinal and widthwise directions of the wheel speed sensor, it is possible to easily detect the magnetic poles of the same polarity provided in the sensor target 160 at the same time (for example, when the first sensing part 220 senses a N pole 162a of the first sensor track 162, the sensing part 230 senses an N pole 164a of the second sensor track 164, while when the first sensing part 220 senses a S pole 162b of the first sensor track 162, the second sensing part 230 senses an S pole 164b of the second sensor track 164). This makes it possible to provide a wheel speed sensor capable of measuring the rotational speed of the wheel while ensuring reliable redundancy.

According to an example embodiment of the present disclosure, the sensor tracks (the first sensor track 162 and the second sensor track 164) positioned inward and outward in the radial direction may be configured such that a circumferential length of one magnetic pole provided in the first sensor track 162 at a radial center of the first sensor track 162 positioned inward in the radial direction is 90% or more of a circumferential length of one magnetic pole provided in the second sensor track 164 at a radial center of the second sensor track 164 positioned outward in the radial direction.

With this configuration, even in the first sensor track 162 formed with a relatively small area in the radial inward direction, a magnetic field having sufficient flux density is formed so that the sensing part can smoothly detect the change in magnetic field. This makes it possible to stably detect the rotational speed of the wheel.

The first sensing part 220 and the second sensing part 230 may be disposed in a manner different from that in the above-described example embodiment as long as they sense the same magnetic poles.

Figure 7A:
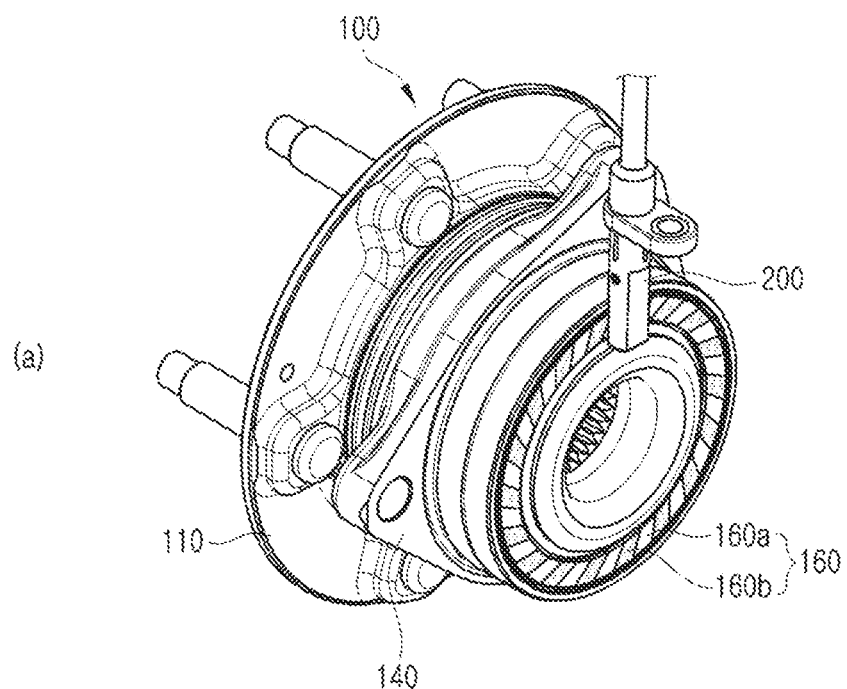
Figure 7B:
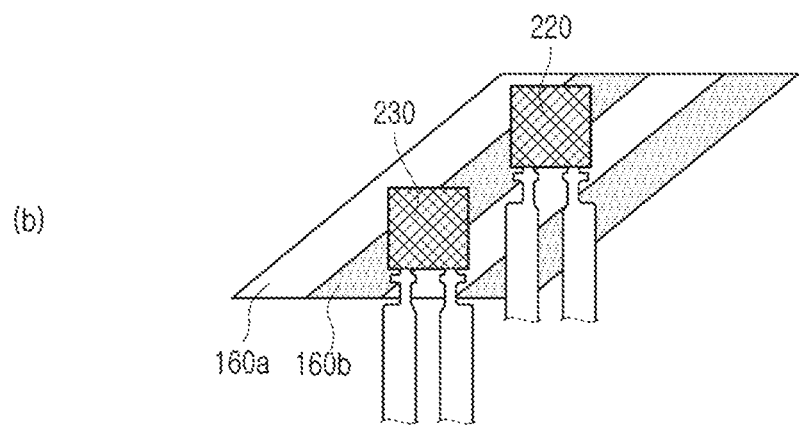

For example, referring to FIG. 7, a modification of the sensor target 160 that can interact with the wheel speed sensor 200 according to an example embodiment of the present disclosure is illustrated. In a case of the modification illustrated with reference to FIG. 7, the sensor target 160 has a structure in which plural pairs of magnetic poles composed of N poles 160a and S poles 160b are arranged along the circumferential direction, and interfaces between the magnetic poles are formed to be inclined with respect to the radial direction.

With this configuration, a plurality of sensing parts (the first sensing part 220 and the second sensing part 230) disposed to be spaced apart from each other in the longitudinal and widthwise directions due to the inclined interface structure formed between the magnetic poles of the sensor target 160 may be more easily positioned to face the magnetic poles of the same polarity formed in the sensor target 160 and may be configured to output the measurement signal of the same phase at the same time. This makes it possible to implement a wheel speed sensor with secured redundancy and high reliability without causing a signal delay or the like.

In the above-described example embodiment, the wheel speed sensor according to an example embodiment of the present disclosure has been described by way of an example in which both the first sensing part 220 and the second sensing part 230 of the wheel speed sensor 200 are implemented as a wheel speed sensor for detecting the rotational speed of the wheel. However, the wheel speed sensor according to an example embodiment of the present disclosure may be configured such that the first sensing part 220 and the second sensing part 230 detect different physical characteristics. In addition to the above-described first sensing part 220 and second sensing part 230, a sensor for detecting the physical characteristics other than the rotational speed may be further provided.

For example, in the wheel speed sensor 200 according to an example embodiment of the present disclosure, the first sensing part 220 may be formed using a wheel speed detection sensor that detects the rotational speed of the wheel, and the second sensing part 230 may be formed using sensors that detect other operational states of the vehicle, such as an acceleration sensor that measures the acceleration of the wheel, a temperature sensor that measures an internal temperature of the wheel bearing, an HR sensor for high-resolution signal, a linear sensor for encoder inspection, a load sensor, a vibration sensor, a sensor for fault detection, and the like. As described above, by forming the sensors provided in the first sensing part 220 and the second sensing part 230 using sensors for detecting different physical characteristics, or adding a sensor that detects physical characteristics other than the rotational speed in addition to the first sensing part 220 and the second sensing part 230, possible to simultaneously detect a plurality of pieces of information relating to the operational state of the vehicle using one wheel speed sensor 200, which increases the functionality of the wheel speed sensor.

While the present disclosure has been described above by way of particular features such as specific constituent elements and the like, and exemplary embodiments, these embodiments are provided to further facilitate overall understanding of the present disclosure, and the present disclosure is not limited thereto. Various modifications and variations may be made from the above descriptions by those skilled in the art.

Therefore, the spirit of the present disclosure should not be limited to the above-described embodiments, and not only the append claims but also all those modified equally or equivalently to the claims are intended to fall within the scope of the spirit of the present disclosure.

What is claimed is:

1. A wheel bearing for supporting a wheel of a vehicle so that the wheel is rotatably mounted on a vehicle body, comprising:
a rotary element mounted on the wheel and configured to rotate together with the wheel;
a non-rotary element fixedly mounted on the vehicle body;
one or more rolling bodies provided between the rotary element and the non-rotary element;
a sensor target mounted on the rotary element and configured to rotate together with the rotary element; and
a wheel speed sensor disposed adjacent to the sensor target to sense a rotational speed of the rotary element,
wherein the wheel speed sensor includes a first sensing part and a second sensing part which are configured to sense a change in magnetic field caused by the rotation of the sensor target,
wherein the second sensing part is disposed to be spaced apart from the first sensing part in a longitudinal direction and a widthwise direction of the wheel speed sensor,
wherein the sensor target includes a first sensor track positioned in a radially inward direction and a second sensor track positioned in a radially outward direction, wherein the first sensor track and the second sensor track are formed to include a same number of pairs of magnetic poles, wherein the first sensing part is disposed to face the first sensor track and configured to sense the change in magnetic field generated by the first sensor track, wherein the second sensing part is disposed to face the second sensor track and configured to sense the change in the magnetic field generated by the second sensor track, and wherein the first sensor track is configured such that a circumferential length of one magnetic pole provided in the first sensor track at a center in a radial direction is 90% or more of a circumferential length of one magnetic pole provided in the second sensor track at a center of the second sensor track in the radial direction.

2. The wheel bearing of claim 1, wherein the first sensing part and the second sensing part are configured as a wheel speed detection sensor configured to detect the rotational speed of the wheel.

3. The wheel bearing of claim 2, wherein the first sensing part and the second sensing part are formed as one of a Hall sensor, an anisotropic magnetoresistance (AMR) sensor, and a giant magnetoresistance (GMR) sensor.

4. The wheel bearing of claim 3, wherein the sensor target is formed in a structure in which one or more pairs of magnetic poles composed of N poles and S poles are arranged along a circumferential direction.

5. The wheel bearing of claim 4, wherein the first sensing part and the second sensing part are configured to sense the magnetic poles of a same polarity provided in the sensor target at a same time.

6. The wheel bearing of claim 1, wherein the first sensor track and the second sensor track are disposed to intersect with each other so that the magnetic poles are not aligned with each other in the radial direction.

7. The wheel bearing of claim 5, wherein the sensor target is configured such that interfaces between the N poles and the S poles are inclined in a similar fashion with respect to the radial direction.

8. The wheel bearing of claim 7, wherein the wheel speed sensor further comprising: a first terminal portion electrically connected to the first sensing part 220; and a second terminal portion electrically connected to the second sensing part.

9. The wheel bearing of claim 8, wherein the first terminal portion and the second terminal portion include a power terminal electrically connected to an external power supply and a signal terminal electrically connected to an external control device.

10. The wheel bearing of claim 8, wherein the wheel speed sensor is fixedly mounted on the vehicle body.

11. The wheel bearing of claim 10, wherein the rotary element includes a wheel hub on which the wheel is mounted, and at least one inner ring mounted to the wheel hub in a press-fitting manner, and wherein the non-rotary element is configured as an outer ring coupled to a chassis component of the vehicle body.

* * * * *